(12) United States Patent
Hauber (10) Patent No.: US 11,597,057 B2
(45) Date of Patent: Mar. 7, 2023

(54) IMPACT FORMING OF THERMOPLASTIC COMPOSITES

(71) Applicant: Trelleborg Sealing Solutions Germany GmbH, Stuttgart (DE)

(72) Inventor: David Edgar Hauber, Troy, NY (US)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 159 days.

(21) Appl. No.: 16/776,915

(22) Filed: Jan. 30, 2020

(65) Prior Publication Data

US 2020/0247035 A1 Aug. 6, 2020

Related U.S. Application Data

(60) Provisional application No. 62/799,864, filed on Feb. 1, 2019.

(51) Int. Cl.
*B24C 1/10* (2006.01)
*B29C 63/00* (2006.01)
(Continued)

(52) U.S. Cl.
CPC .............. *B24C 1/10* (2013.01); *B29C 63/003* (2013.01); *B29C 63/48* (2013.01);
(Continued)

(58) Field of Classification Search
CPC ..... B29C 63/003; B29C 63/48; B29C 63/481; B29C 66/8341; B29C 66/95; B29C 70/30;
(Continued)

(56) References Cited

U.S. PATENT DOCUMENTS 4,557,778 A 12/1985 Held
6,461,455 B1 10/2002 Meatto et al.
(Continued)

FOREIGN PATENT DOCUMENTS

CN 106626715 A 5/2017
EP 1 337 400 A1 8/2003
(Continued)

OTHER PUBLICATIONS

Notification of Transmittal of the International Search Report and the Written Opinion of the International Searching Authority, or the Declaration dated Jun. 2, 2020 for International Application No. PCT/US2020/016068 (9 pages).

*Primary Examiner* — George R Koch
(74) *Attorney, Agent, or Firm* — Orbit IP (57) ABSTRACT

Disclosed embodiments provide automated fiber placement techniques for fabrication of parts made from composite materials. A peening system with multiple pins provides compaction over irregular surfaces, providing superior performance as compared with traditional compaction rollers. The apparatus that carries out the techniques include a tape dispensing system, a heating system, a peening system, a processor and a memory coupled to the processor. The memory contains instructions that when executed by the processor perform the steps of: dispensing a first ply of thermoplastic composite tape over a mandrel; dispensing a second ply of thermoplastic composite tape on the first ply; and peening the second ply onto the first ply, such that the second ply is bonded to the first ply.

24 Claims, 9 Drawing Sheets

(51) Int. Cl.
*B29C 65/00* (2006.01)
*B29C 63/48* (2006.01)
*B29C 70/40* (2006.01)
*B29C 70/54* (2006.01)
*B29C 70/34* (2006.01)
*B29C 70/30* (2006.01)
*B29L 9/00* (2006.01)
*B05D 1/02* (2006.01)

(52) U.S. Cl.
CPC .......... *B29C 66/8341* (2013.01); *B29C 66/95* (2013.01); *B29C 70/30* (2013.01); *B29C 70/34* (2013.01); *B29C 70/40* (2013.01); *B29C 70/545* (2013.01); *B05D 1/02* (2013.01); *B05D 2201/00* (2013.01); *B29C 2063/483* (2013.01); *B29L 2009/00* (2013.01); *B32B 2274/00* (2013.01)

(58) Field of Classification Search
CPC ....... B29C 70/34; B29C 70/40; B29C 70/545; B29C 2063/483; B24C 1/10; B05D 1/02; B05D 2201/00; B29L 2009/00; B32B 2274/00
See application file for complete search history.

(56) References Cited

U.S. PATENT DOCUMENTS

| | | | |
|---|---|---|---|
| 2004/0081849 A1* | 4/2004 | Westre | B32B 15/14 |
| | | | 428/687 |
| 2006/0191622 A1 | 8/2006 | Ritter et al. | |
| 2010/0078845 A1 | 4/2010 | Guzman et al. | |
| 2013/0149491 A1 | 6/2013 | Wakeman et al. | |
| 2014/0291886 A1* | 10/2014 | Mark | B29C 69/001 |
| | | | 264/163 |
| 2017/0129180 A1* | 5/2017 | Coates | B23Q 3/15506 |
| 2018/0154591 A1* | 6/2018 | Hauber | B29C 70/382 |
| 2018/0186104 A1 | 7/2018 | Beraud et al. | |
| 2019/0224925 A1* | 7/2019 | Hamlyn | B29C 70/24 |

FOREIGN PATENT DOCUMENTS

| | | | | |
|---|---|---|---|---|
| WO | 02/32664 A1 | 4/2002 | | |
| WO | 2017/212394 A1 | 12/2017 | | |
| WO | WO-2018060559 A1 * | 4/2018 | ........... | B29C 70/081 |

* cited by examiner

IMPACT FORMING OF THERMOPLASTIC COMPOSITES

CROSS REFERENCE TO RELATED APPLICATIONS

This is a non-provisional application based upon U.S. provisional patent application Ser. No. 62/799,864, entitled "IMPACT FORMING OF THERMOPLASTIC COMPOSITES", filed Feb. 1, 2019, which is incorporated herein by reference.

BACKGROUND OF THE INVENTION

1. Field of the Invention

The present invention relates generally to an apparatus that forms composite structures, and more particularly, to impact forming of thermoplastic composites.

2. Description of the Related Art

Thermoplastic composite structures are formed by melt bonding layers of reinforced thermoplastic polymers. In recent years, composite materials are being used for a variety of applications that previously relied on metal. High strength and lightweight, composite materials are being used in parts such as aircraft wings, automobile rims, and other critical components. While composite materials provide improved performance in terms of strength to weight ratios, the time and cost of manufacture continues to be an issue.

What is needed in the art are improvements in the manufacture of composite structures relative to economics and efficiency.

SUMMARY OF THE INVENTION

Thermoplastic composites are used in a variety of applications, including aerospace and automotive applications, where the reduced weight of thermoplastic composite parts as compared with similar metal parts can translate into increased performance and improved fuel economy. In these applications, thermoplastic composite parts may be formed into complex surfaces such as a wing with a curvature, or a body part of an automobile with complex curves, corners, creases, and the like. With these complex surfaces, a compaction roller often cannot provide complete compaction coverage, resulting in voids in the thermoplastic composite material that adversely affect the integrity of the thermoplastic composite material.

Disclosed embodiments overcome the aforementioned problems by using a peening system in place of, or in addition to, a compaction roller. The peening system may include a needle peening system, a shot peening system, an electronically activated peening system, a combination thereof, or another suitable peening system. With a peening system, pins or particles (in the case of shot peening) provide improved compaction coverage over the complex surfaces, improving the quality and integrity of the thermoplastic composite material.

Additional benefits of use of the peening system include improving consolidation. The multiple impacts and high dynamic loads of the peening system, provide the ability to conform to uneven surfaces results in improved laminate consolidation. Additionally, the multiple impacts, high dynamic loads, and the ability to conform to uneven surfaces results in reduced voids. In particular, the high dynamic compaction loads result in void collapse, improving structural integrity. Furthermore, similar to work hardening of metals by impact processing, impact forming of thermoplastic composites increases the crystallinity of semi-crystalline polymers. The strain hardening of semi-crystalline polymers due to increased crystallization also contributes to improved structural integrity of the thermoplastic composite material.

The use of the peening system in disclosed embodiments may further provide the benefits of relieving residual stress of the thermoplastic materials. The thermoplastic composite material typically comprises a polymer material with fibers dispersed throughout. The composite is heated, and while in a heated state, gets compacted. As the polymer cools, it contracts. Typically, the polymer has a different coefficient of thermal expansion (CTE) than the fibers. As the material cools, a residual stress builds up that can cause warpage of the material. The peening process relaxes the residual stress, serving to reduce warpage. Thus, the impacts from the peening system impart compressive stress in the thermoplastic composite material (laminate) to counteract the tensile stress that results from CTE and crystallization induced shrinkage during in-situ consolidation (ISC). The number of impacts, frequency of impacts, impact force, temperature of the laminate, and other variables can be controlled to relieve or compensate for residual stresses.

Disclosed embodiments are configured to impact the entire surface (or selected areas of the entire surface) of the composite material being applied, with a minimum of one and preferably 10 or more impacts. As an example, if a thermoplastic composite tape ply (Note the term "tape" and "tape ply" are used interchangeably) is moving at 1,000 mm/second and the peening system has pins that are 1 mm long (in the direction of travel), then a 1 kHz impact frequency is utilized to impact each area of the surface one time (Frequency=(1000 mm/sec)/1 mm=1 kHz). With an ultrasonic impactor, disclosed embodiments can achieve 20-40 kHz or 20-40 impacts per site in this example.

Disclosed embodiments may configure the peening system to provide an impact pressure in the range of 10 MPa to 100 MPa (1450 PSI to 14500 PSI) for carbon fiber PEEK composites but other suitable ranges might be used. The impact pressure is an important parameter in getting a successful output of a thermoplastic composite material forming system. If the impact pressure is too high, the polymer and/or fibers can be damaged, weakening the material. If the impact pressure is too low, then voids remain in the thermoplastic composite material, reducing its structural integrity.

In embodiments, the process temperature ranges from 20 degrees Celsius to 600 degrees Celsius. In particular embodiments, the process temperature ranges from 143 degrees Celsius to 500 degrees Celsius, which is suitable for carbon fiber PEEK (Polyether ether ketone), where 143 degrees Celsius is above the glass transition temperature where deformation and crystallization more readily occurs, and 600 degrees Celsius is where polymer degradation more readily occurs.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Disclosed embodiments provide automated fiber placement techniques for fabrication of parts made from composite materials. In some embodiments, tape plies are wound around a mandrel while, optionally, a polymer is dispensed on a tape ply shortly before compaction. A peening system with multiple pins provides compaction over irregular surfaces, providing superior performance as compared with traditional compaction rollers.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

Figure 1A:
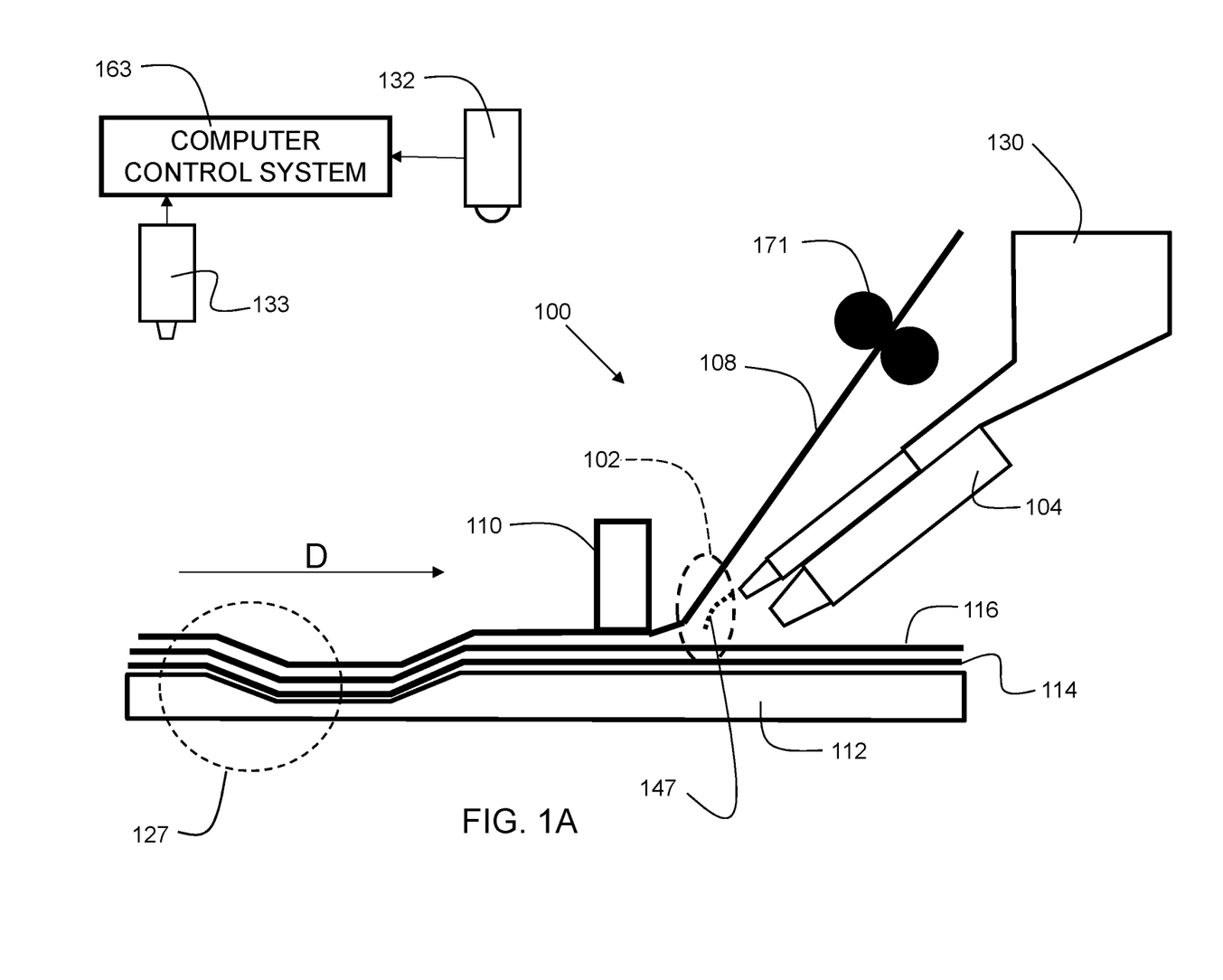
FIG. 1A illustrates an apparatus utilizing a peening system in accordance with embodiments of the present invention.

FIG. 1A is a diagram of an apparatus 100 utilizing an optional polymer dispensing system, such as a filament polymer dispensing system, liquid polymer dispensing system, powder polymer dispensing system, a combination thereof, or other suitable polymer dispensing system now known or hereafter developed. Thermoplastic composite tape plies are placed over a tool (mandrel) 112 to form a desired component shape. As shown in FIG. 1A, tape 114 and tape 116 have been previously applied. Tape 108 is currently being applied, and is fed through feed roller system 171. The currently applied tape 108, heat source 104, and associated tape supply mechanism travel in direction D to apply the tape. Thus, the heat source 104 applies heat to the currently applied tape 108 as it is dispensed from tape feed roller system 171, and also applies heat to the previously applied tape 116. The heat source 104 may be a laser, hot gas torch, or any other suitable device now known or hereafter developed. The area where heat is applied is referred to as a Heat Affected Zone (HAZ) 102. An optional polymer dispensing system 130 dispenses a polymer 147. The polymer 147 melts as it enters the HAZ 102. The HAZ raises the currently applied tape 108, polymer, and the previously applied tape 116 to a temperature suitable to affect a bond between the layers. Currently applied tape 108 is then compacted to (pressed against) previously applied tape 116 with the polymer 147 disposed between them, by peening system 110, causing a strong bond to form between tape ply 108 and tape 116. The mandrel 112 may include complex surfaces such as indicated by region 127. The complex surfaces can include corners, creases, curves, and/or other shapes that a compaction roller cannot cover as effectively as peening system 110.

The peening system 110 may include a device with multiple pins such as an electronically-actuated peening system, or an ultrasonically-driven peening system. Each pin can move independently of the other pins to better conform to a complex shape than a compaction roller. Alternatively, the peening system 110 may include a shot peening system, in which multiple particles are actuated to impact the composite material surface. In embodiments, the particles may include metal, glass, and/or ceramic particles, or other suitable material now known or hereafter developed. In some embodiments, the particles may be comprised of a nickel alloy.

The apparatus 100 may further include a computer control system 163. An image acquisition device (e.g., camera) 132 is disposed to monitor the output parameters of the device, such as the warpage, impact density, and/or impact depth of the finished product (the thermoplastic composite material created by system 100).

Image acquisition device 132 is coupled to the computer control system 163 to measure automated warpage and/or peening system impact depth/density. The computer control system 163 is at least one computing device, having a processor and memory. The memory may store instructions, that when executed by the computing device, perform automated warpage and/or peening system impact depth/density. In embodiments, image acquisition device 132 may be a video camera, still camera, or other digital image acquisition device. The image acquisition device may be a visible light camera, near field camera, infrared light camera, X-ray camera, or other suitable imaging device. While one camera is shown in FIG. 1A, in embodiments, multiple cameras may be used to monitor the warpage and/or peening impact depth and/or peening impact density from a variety of angles and vantage points. Computer control system 163 may further include a laser scanner, laser profilometer or other suitable device 133 to perform precise depth/distance measurements used in determining warpage and/or peening system impact depth/density.

Process parameters can be controlled in real time by measuring the consolidated tape and adjusting the impact force, impact frequency, process heat, and process speed. Suitable sensors include laser profilometers, IR cameras, optical cameras, a combination thereof, or other suitable device. A laser profilometer is an example of a sensor that could measure the shape of the surface so that the deformation could be controlled by changing impact force and/or impact frequency. An IR camera could be used to measure temperature profile to detect disbonds and voids, and the main controller (218 of FIG. 2) could direct an increase in compaction force, process heat, and/or process speed. A disbonded area could be reprocessed to improve the bond. An optical camera could be used to measure surface appearance such as surface roughness or fiber damage so that impact force and frequency could be decreased.

The tape shrinks as it cools due to its Coefficient of Thermal Expansion (CTE) at varying rates depending on factors, non-limiting examples of which include the type of fiber, matrix, and the direction (e.g. fiber direction or cross-fiber direction) in which shrinkage is measured. The peening system 110 provides a compressive stress that relaxes this residual stress, serving to reduce undesirable warpage.

As can be seen in FIG. 1A, the compaction roller is eliminated Eliminating the compaction roller and using the peening system 110 to compact the incoming tape has the added benefit of conforming to uneven surfaces.

There are no conformable compaction rollers within the existing state of the art for high temperature thermoplastics such as PEEK where processing temperatures may exceed 500 degrees Celsius.

Figure 1B:
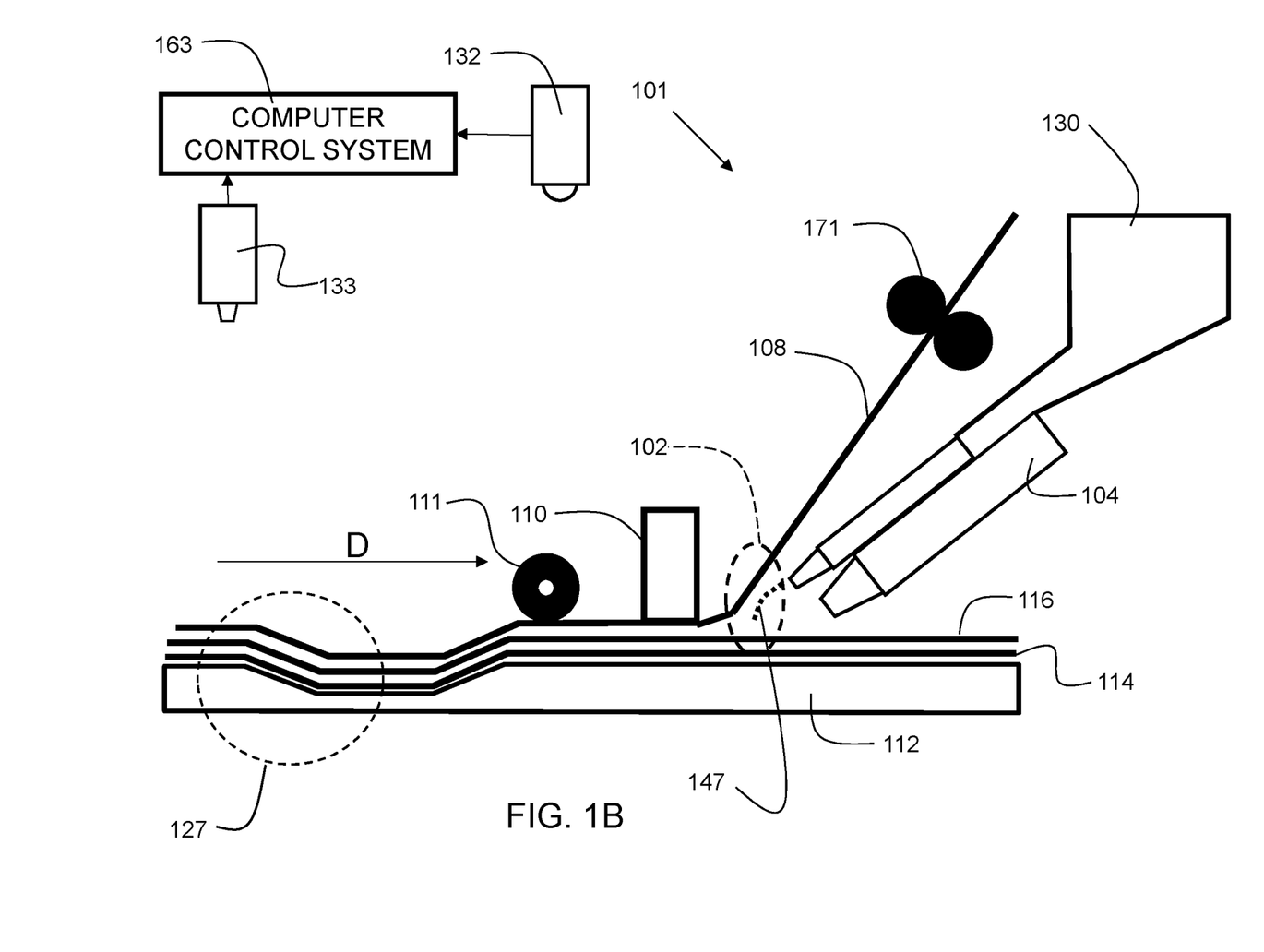
FIG. 1B is a diagram of an apparatus utilizing a peening system followed by a compaction roller in accordance with additional embodiments of the present invention.

FIG. 1B is a diagram of an apparatus 101 utilizing a polymer dispensing system. Apparatus 101 of FIG. 1B is similar to apparatus 100 of FIG. 1A, with a main difference being the inclusion of a compaction roller 111 downstream of the peening system 110. In embodiments, compaction roller 111 is an elastomeric following roller that is capable of conforming to the surface and, as the compaction roller 111 is disposed downstream of the peening system 110, is not exposed to the high temperatures of the HAZ 102.

Figure 1C:
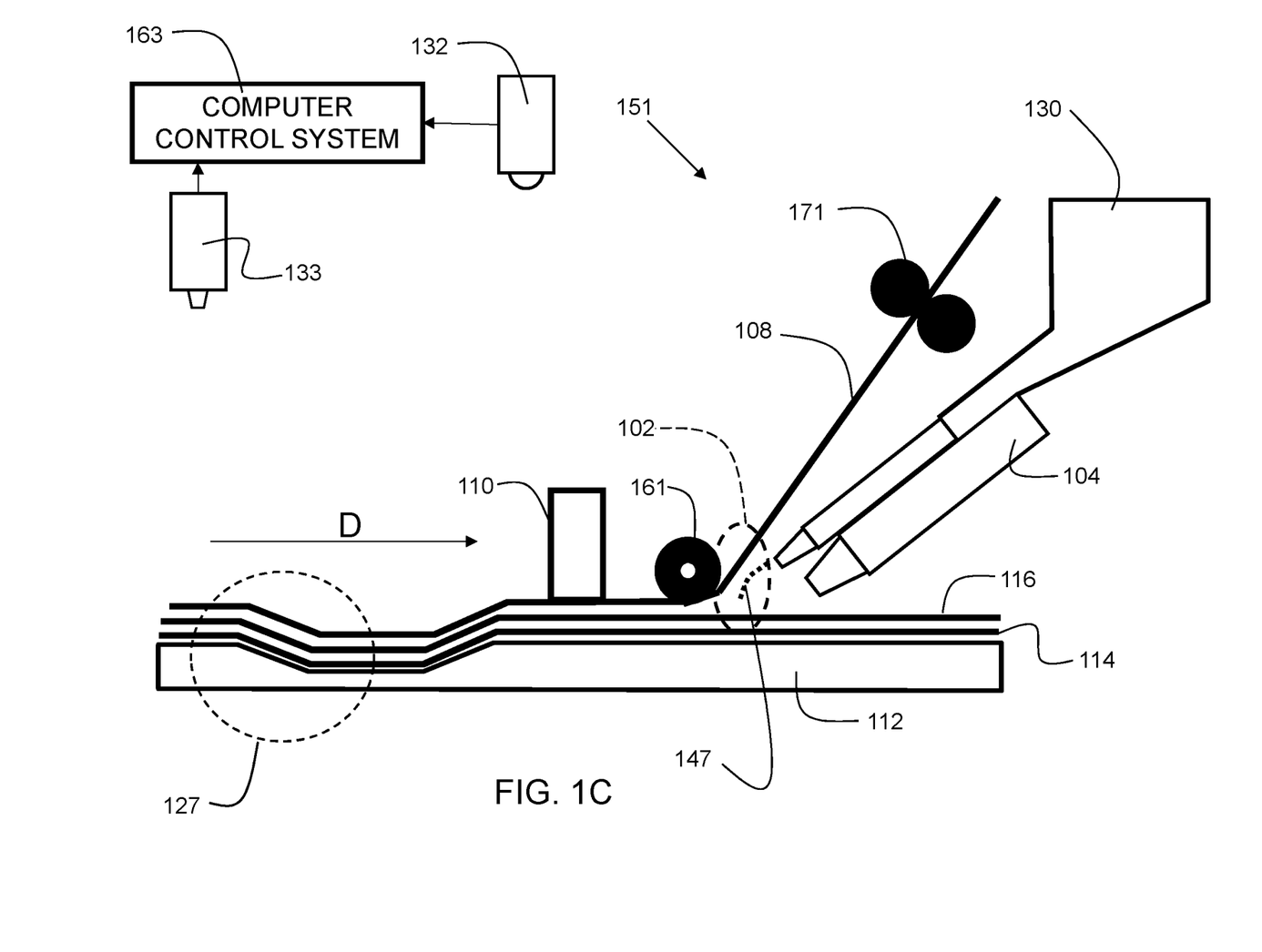
FIG. 1C is a diagram of an apparatus utilizing a compaction roller followed by a peening system in accordance with additional embodiments of the present invention.

FIG. 1C is a diagram of an apparatus 151 utilizing an optional polymer dispensing system 130. Apparatus 151 of FIG. 1C is similar to apparatus 101 of FIG. 1B, with a main difference being that compaction roller 161 is disposed upstream of the peening system 110. In embodiments, compaction roller 161 is a metal, ceramic, or other suitable material that can withstand the high temperatures of the HAZ 102.

Figure 2:
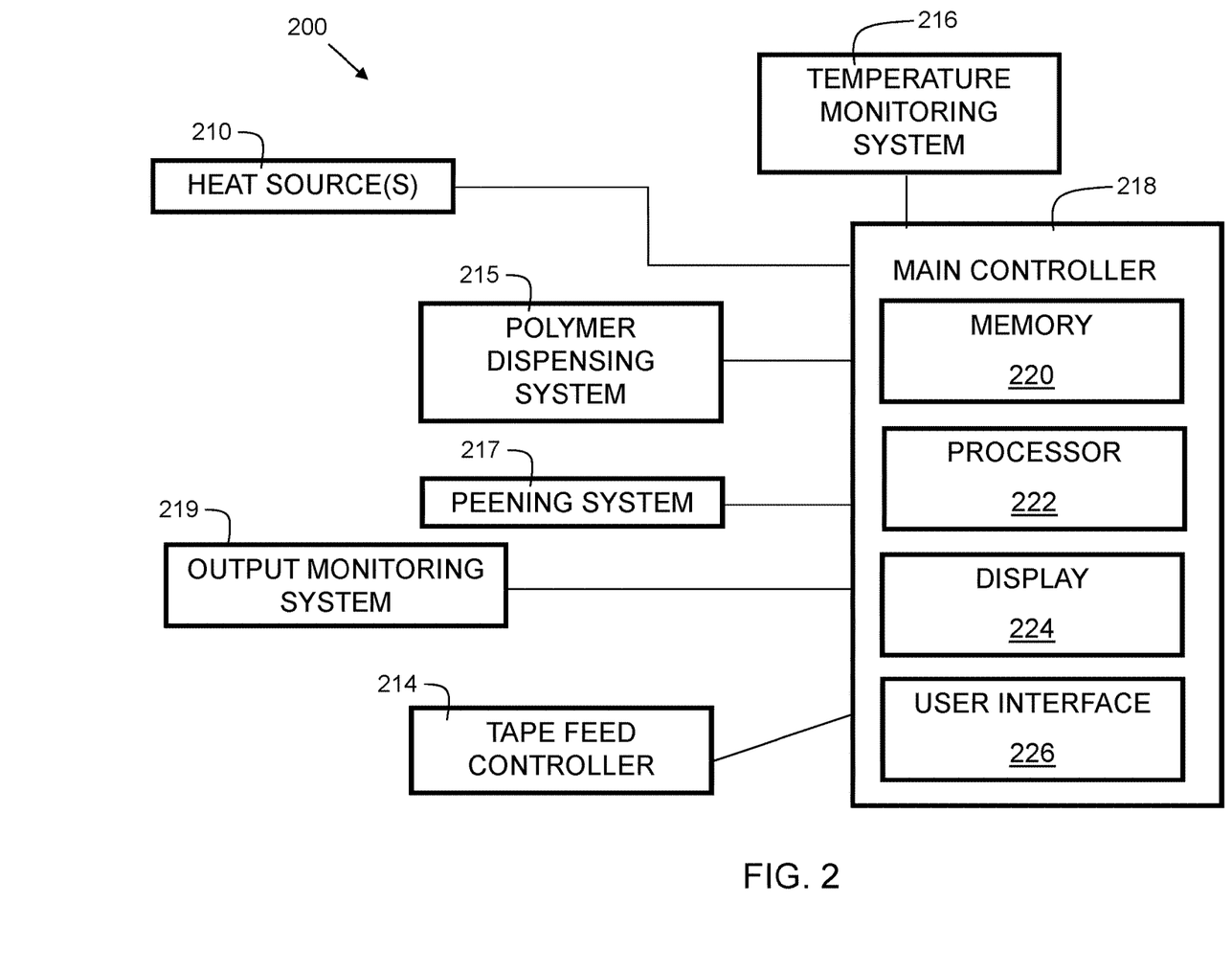
FIG. 2 is a block diagram of the apparatus in accordance with embodiments of the present invention illustrated in FIGS. 1A-1C.

FIG. 2 shows a system block diagram in accordance with an embodiment of the present invention. System 200 comprises a main controller 218. Main controller 218 may be a computer comprising memory 220, and a processor 222 which is configured to read and write memory 220. The memory 220 may be non-transitory memory, such as flash, ROM, non-volatile static ram, or the like. The memory 220 contains instructions that, when executed by processor 222, control the various subsystems to operate system 200. Main controller 218 may also comprise a display 224 and a user interface 226 for interacting with the system 200. The user interface 226 may comprise a keyboard, touch screen, mouse, and/or the like.

The main controller 218 may receive temperature information from temperature monitoring system 216. Temperature monitoring system 216 may comprise a non-contact device for measuring the temperature of the material near the exit point or heat affected zone (HAZ). The temperature monitoring system 216 may comprise a thermal imaging system or other suitable apparatus/system for monitoring the temperature of the material near the HAZ. The main controller may in turn adjust the energy output of one or more of the heat sources 210 to maintain a desired temperature range. The material dispensing speed, which determines the amount of time the material remains within the HAZ, may also be monitored by the main controller 218 by communicating with tape feed controller 214. If the dispensing speed increases, the energy output may also be increased to compensate for the reduced time the material spends in the HAZ. If the speed increases beyond the point where the temperature can be maintained at the desired temperature, the main controller 218 can communicate with the tape feed controller 214 to reduce the speed.

The main controller 218 may receive output parameter information from output monitoring system 219. Output monitoring system 219 may comprise a computer control system and/or laser scanner for assessing the quality of the output thermoplastic composite material. In embodiments, the computer control system may include a laser profilometer. Parameters may include tape warpage, deflection (indentation) density, deflection (indentation) depth, and/or other suitable parameters. This information may be used by the main controller 218 to control the peening system 217. The control can include increasing or decreasing the frequency and/or impact force of the peening system. In some embodiments utilizing an electronically-actuated peening system, an asymmetrical peening pattern may be configured into peening system 217 in response to detecting a warpage by the output monitoring system 219.

The memory 220 of the main controller 218 may be configured to store a plurality of material profiles, or access them from an outside database. Each material profile may contain the various associated parameters for optimal heating, such as a desired energy density profile for that material. For example, some materials may perform better when heated gradually, whereas for other materials, a specific exit temperature range may be more important. The profile for each material may contain the preferred energy output settings for each heat source, and may also contain a preferred material dispensing speed. When a user is using a particular material, s/he may select the corresponding material profile, which then establishes the desired settings of the heat sources 210 and optionally the dispensing speed by communicating with tape feed controller 214. The profile may further include peening parameters used to configure the peening system 217 for the particular material. The peening parameters can include a peening impact force, peening frequency, and/or peening pattern.

The main controller 218 is further in communication with an optional polymer dispensing system 215. In embodiments, the polymer dispensing system 215 may include a filament polymer dispensing system, powdered polymer dispensing system, and/or a molten polymer dispensing system. Once the polymer is dispensed into, or in close proximity to, the heat affected zone (HAZ) created by heat sources 210, it gets compacted by the peening system 217. Embodiments may further include a compaction roller upstream and/or downstream of the peening system (as shown in FIGS. 1B and 1C).

Figure 3:
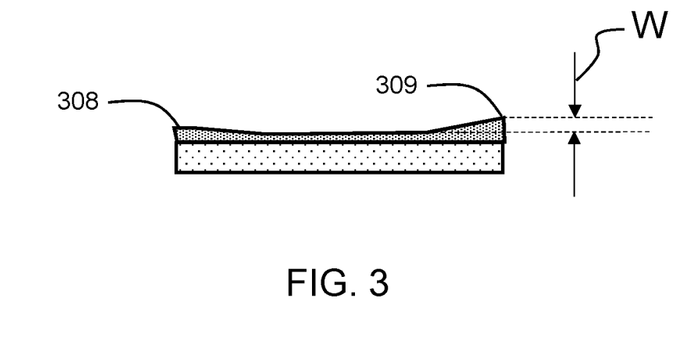
FIG. 3 shows an example of in-process warpage detection in accordance with embodiments of the present invention.

FIG. 3 shows an example of in-process warpage detection in accordance with embodiments of the present invention. FIG. 3 shows a view from the vantage point as being viewed from arrow D of FIG. 1C. In this view, multiple image acquisition devices are depicted. A first image acquisition device 132 may be oriented to acquire view of the most recently applied tape 308 (the second ply—which was dispensed over the first ply). A second image acquisition device 159 may be oriented at a different angle to provide additional views of the most recently applied tape 308. In some embodiments, the image acquisition devices may be oriented at an angle ranging from 30 to 90 degrees with respect to the tape. Using various image techniques such as triangulation (with multiple cameras), focus adjustments, focal length and triangular similarity, and/or other suitable techniques, the maximum and minimum height of the tape 308 may be determined. The difference between minimum and maximum height, indicated as W, can be used as an indication of warpage of the tape 308. Optionally, a laser scanner 133 may be oriented to monitor the warpage and peening impact density/depth of the tape 308. The detecting of warpage may include detecting warpage such as a disbond of the topmost ply of the tape 308. In some embodiments, in addition to or instead of the topmost ply, the warpage is detected in underlying tape plies. The peening impact density is the number of impacts per unit area (e.g. square centimeters). The peening impact depth is a measure of how much of an indentation the peening system causes in the tape 308.

The information acquired by the laser scanner 133 and the image acquisition devices (cameras) 132 and 159 may be sent to the computer control system 163, temperature monitoring system 216, polymer dispensing system 215, peening system 217, and/or tape feed controller 214 to adjust production parameters. Thus, disclosed embodiments improve the technical field of thermoplastic composite material production.

Figure 4A:
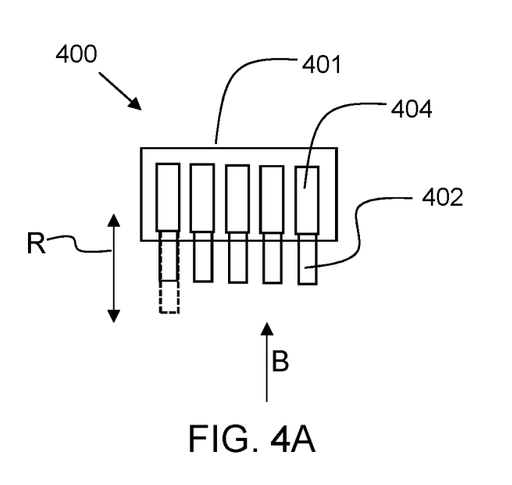
FIG. 4A shows a side view of an electronically actuated peening system in accordance with embodiments of the present invention.

FIG. 4A shows a side view of an electronically actuated peening system 400 in accordance with embodiments of the present invention. Peening system 400 includes an enclosure 401 that contains multiple pins, an example of which is indicated generally as 402. Each pin 402 may be independently actuated by a motive means such as a solenoid piezoelectric driver or other suitable means 404. The pins 402 can be of any size or shape including but not limited to rods, bars, and hexagons, but blunt ends are generally preferred so as to minimize damage to composite fibers. Higher frequencies are generally preferred so that higher surface speeds can be achieved. Each pin 402 can travel up and down in the directions indicated by arrow R. Each motive means 404 can cause its corresponding pin to move downward, providing impact to a material disposed below the peening system 400. Multiple overlapping impacts are preferred to ensure full surface coverage, but it is desirable to be able to control the number and intensity of the impacts to achieve the desired effect. Longer strokes of the pins 402 are preferred to allow treatment over curved surfaces.

Figure 4B:
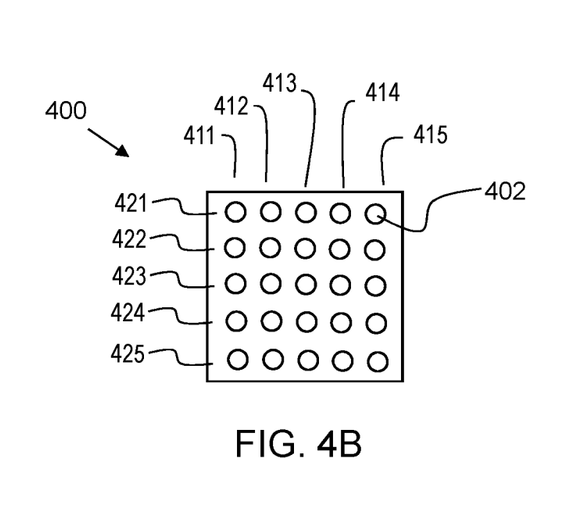
FIG. 4B shows a bottom-up view of an electronically actuated peening system in accordance with embodiments of the present invention.

FIG. 4B shows a bottom-up view of the electronically actuated peening system as viewed in the direction of arrow B of FIG. 4A. As can be seen in FIG. 4B, the peening system 400 comprises multiple electronically actuated pins 402 arranged in a square 5×5 matrix. There are five columns of pins, indicated as column 411, 412, 413, 414, and 415. There are five rows of columns, indicated as row 421, 422, 423, 424, and 425. As an example, the pin indicated as 402 is the pin denoted by row 421 and column 415. Other embodiments may include different matrix sizes. In some embodiments, the electronically actuated peening system may not necessarily be organized in a square configuration. It may be configured in any suitable shape.

Each pin 402 of the electronically actuated peening system 400 shown in FIG. 4A and FIG. 4B can be individually actuated based on commands from processor 222. This can enable an adaptive warpage correction process is some embodiments. Depending on various factors, such as orientation of fibers and tape plies, warpage may not always be symmetrical. As an example, referring again to FIG. 3, point 309 of tape 308 has maximum warpage. In embodiments, an electronically actuated peening system 400 can be configured to provide more impact force on a side of the tape 308 that has increased warpage, in response to detecting asymmetrical warpage by computer control system 163. Thus, embodiments can include detecting asymmetrical warpage of the dispensed tape; and directing an asymmetrical peening response towards the asymmetrical warpage of the dispensed tape.

Figure 5:
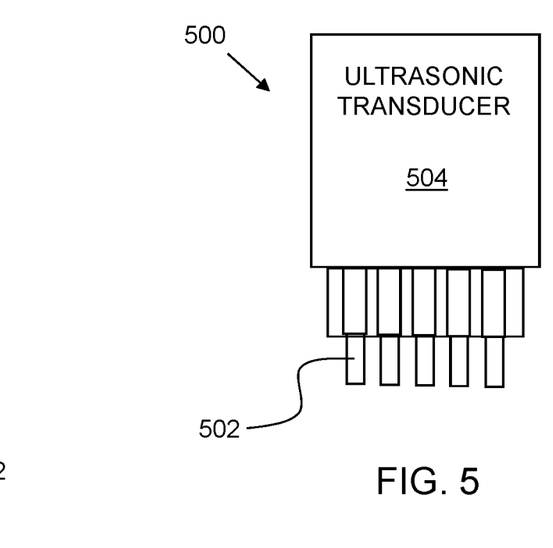
FIG. 5 shows a side view of an ultrasonically driven peening system in accordance with embodiments of the present invention.

FIG. 5 shows a side view of an ultrasonically-driven peening system 500 in accordance with embodiments of the present invention. Peening system 500 comprises an ultrasonic transducer 504 configured and disposed to actuate peening pins, shown generally as 502.

Figure 6:
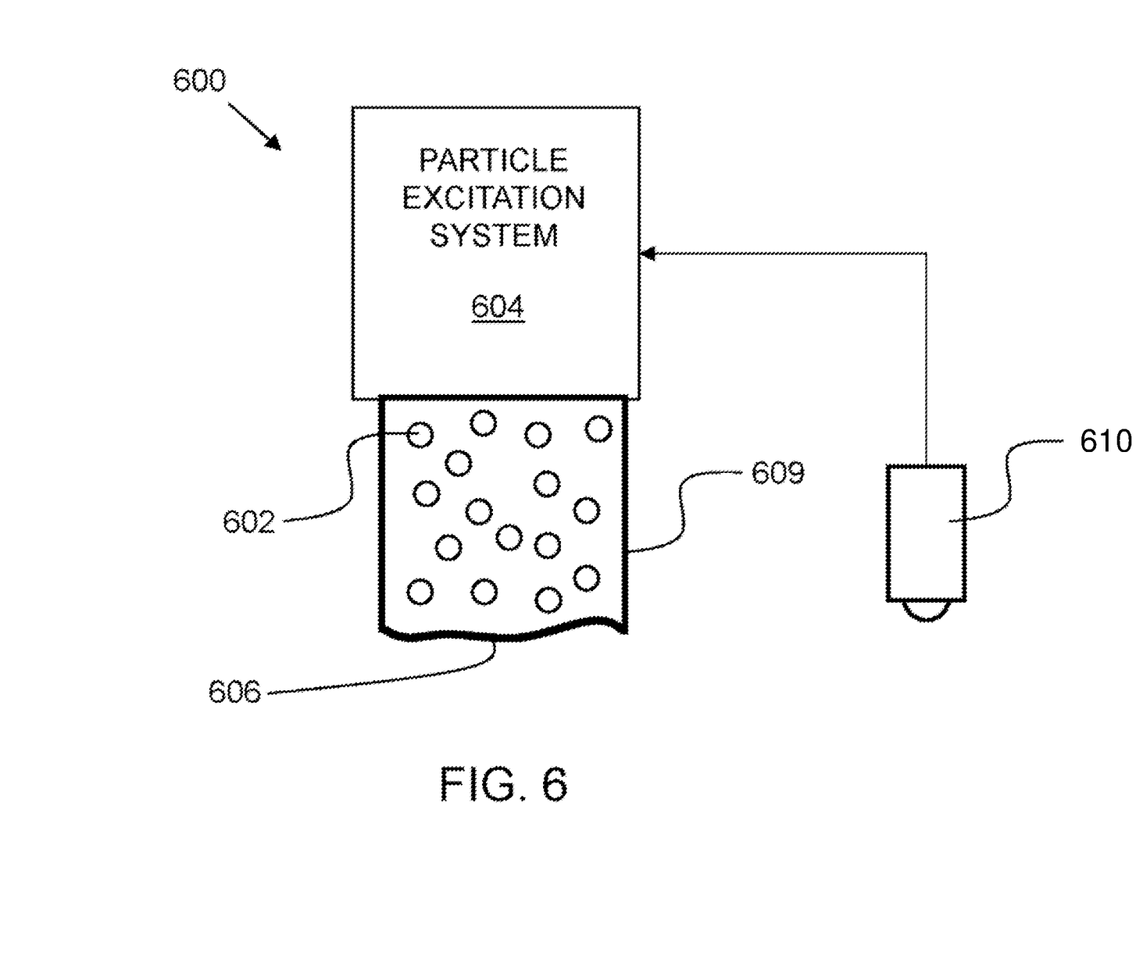
FIG. 6 shows a side view of a shot peening system in accordance with embodiments of the present invention.

FIG. 6 shows a side view of a shot peening system 600 in accordance with embodiments of the present invention. A particle excitation system 604 moves particles 602 within a hollow particle chamber 609. The particle chamber 609 may be capped with a pliable membrane 606. The particle excitation system 604 moves the particles 602 towards pliable membrane 606 to provide impact to a thermoplastic composite material surface in accordance with embodiments of the present invention. In embodiments, the particles 602 can be comprised of metal (e.g. nickel alloy), glass, a ceramic, or other suitable material. In embodiments, the membrane may be comprised of a metal tape, metal mesh, fabric comprised of woven metal fibers, or other suitable membrane. In embodiments there may be no membrane allowing the particles 602 to directly impact the thermoplastic composite material and employ a pliable edge seal to contain the particles over complex surfaces. In embodiments, the particle excitation system 604 may comprise a piezoelectric element and/or a vibrator. Embodiments utilizing a shot peening system may further include a detector, such as an inductive sensor 610 to ensure that no metal shot particles escape the peening system and contaminate the thermoplastic material. Upon detection, the shot particles may be removed, or alternatively, the batch of material may be discarded. A similar approach may also be utilized with other peening systems. Although the probability of contamination is low, a piece of metal (e.g. from a broken peening pin) could cause a failure if it escaped into the thermoplastic composite material. Thus, embodiments can include a foreign object debris (FOD) detection system that is downstream of the peening system.

Figure 7:
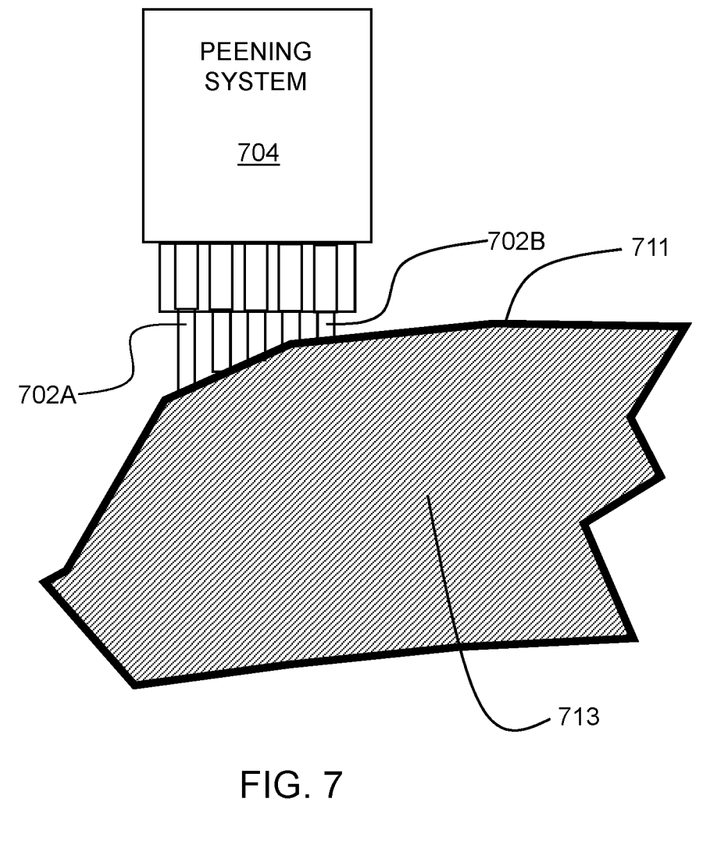
FIG. 7 shows an example of a peening system applied to an irregular surface in accordance with embodiments of the present invention.

FIG. 7 shows an example of a peening system 704 applied to an irregular surface in accordance with embodiments of the present invention. Object 713 is comprised of the thermoplastic composite material applied by an automated fiber placement (AFP) apparatus of disclosed embodiments that utilizes peening system 704. Each peening pin serves as an impactor. Disclosed embodiments use multiple impactors with sufficient range of motion (stroke or travel distance). The pins of the peening system 704 operate independently with different amounts of vertical travel to accommodate irregular shapes. As an example, peening pin 702A has extended further than peening pin 702B to accommodate the irregular surface 711. In situations where high process temperatures are used, peening system 704 can operate in the HAZ, while a conformable roller is not able to survive the hot (e.g., 500 degrees Celsius or more) process temperatures.

Figure 8:
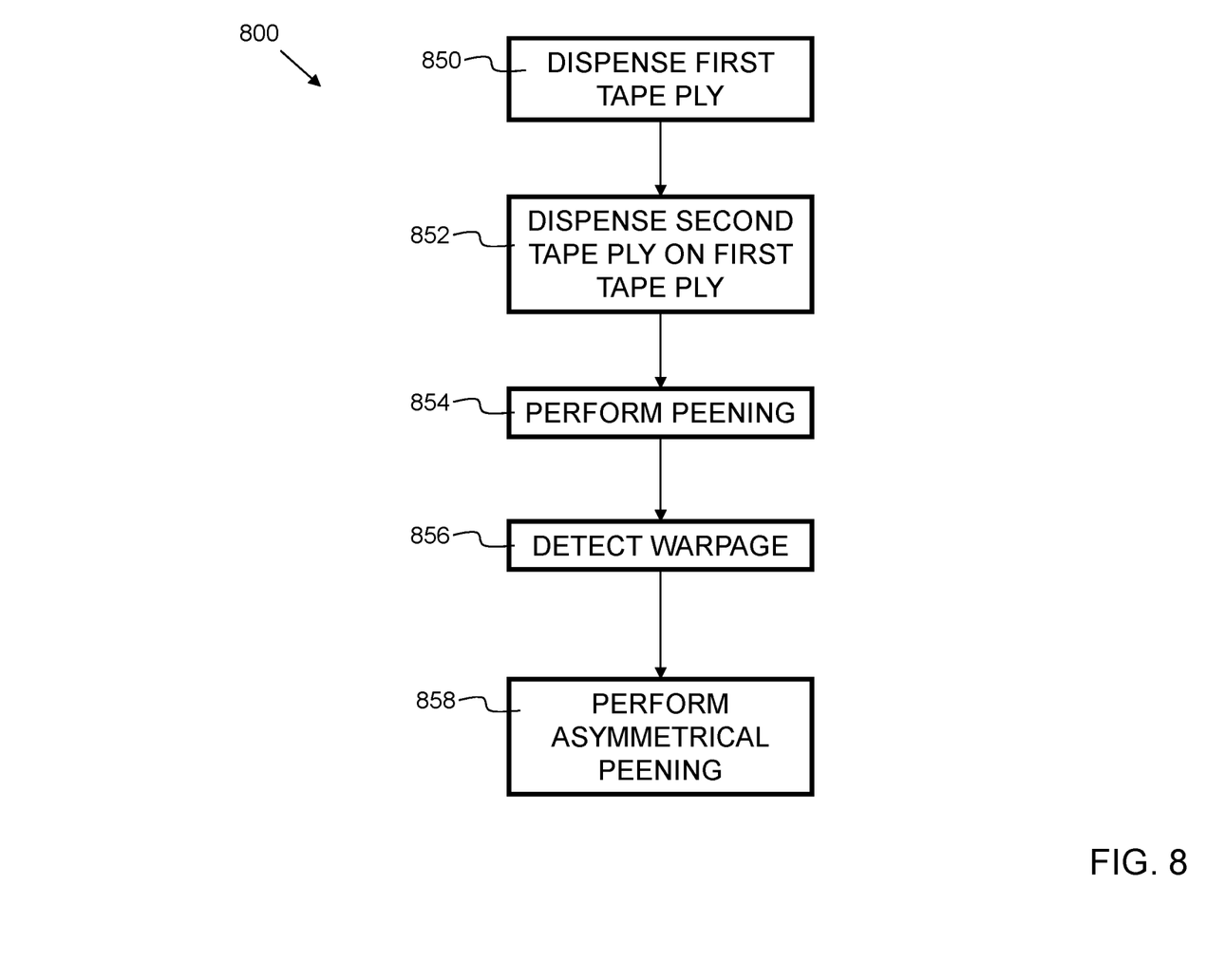
FIG. 8 is a flowchart indicating process steps for the embodiments of the present invention.

FIG. 8 is a flowchart 800 indicating process steps for embodiments of the present invention. At 850, a first tape ply is dispensed. At 852, a second tape ply is dispensed over the first tape ply. At 854, peening is performed. Optionally, at 856, warpage is detected. At 858, optionally, asymmetrical peening is applied as a corrective measure for the warpage detected at 856.

As can now be appreciated, embodiments of the present invention provide a method and apparatus for automated fiber placement techniques for fabrication of parts made from composite materials. Complex surfaces such as creases, curves, and corners are difficult for compaction rollers alone to sufficiently remove voids. Disclosed embodiments utilize a peening system instead of, or in addition to, a compaction roller. Disclosed embodiments use multiple impactors with sufficient range of motion (stroke or travel distance) such that they conform to the irregular surface while inducing compressive residual stress, compaction force, void collapse, and crystallization. Disclosed embodiments serve to counteract process induced tensile residual stress in irregular laminate surfaces.

Thus, disclosed embodiments improve the technical field of thermoplastic composite material fabrication by utilizing a peening system to provide improved compaction and void removal on irregular surfaces. This allows fabrication of high-performance components such as aircraft parts, automobile parts, and any other type of irregularly surfaced part, in a cost-effective and time-efficient manner.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus comprising:
   a tape dispensing system configured for dispensing a thermoplastic composite tape;
   a heating system;
   a peening system;
   a processor; and
   a memory coupled to the processor, wherein the memory contains instructions that when executed by the processor perform the steps of:
   dispensing from the tape dispensing system a first ply of thermoplastic composite tape over a mandrel;
   dispensing from the tape dispensing system a second ply of thermoplastic composite tape on the first ply;
   heating the first ply and/or the second ply of the thermoplastic composite tape as the second ply is dispensed onto the first ply; and thereafter
   peening directly the second ply onto the first ply using the peening system, such that the second ply is bonded to the first ply.

2. The apparatus of claim 1, wherein the peening system comprises a shot peening system.

3. The apparatus of claim 2, wherein the shot peening system comprises a plurality of metal particles.

4. The apparatus of claim 2, wherein the shot peening system comprises a plurality of glass particles.

5. The apparatus of claim 2, wherein the shot peening system comprises a plurality of ceramic particles.

6. The apparatus of claim 1, wherein the peening system comprises an ultrasonically driven peening system.

7. The apparatus of claim 1, wherein the peening system comprises an electronically actuated peening system.

8. The apparatus of claim 1, further comprising a computer control system, wherein the memory further contains instructions, that when executed by the processor, further performs the step of monitoring a warpage of the dispensed second ply of thermoplastic composite tape.

9. The apparatus of claim 8, wherein the computer control system comprises at least one camera.

10. The apparatus of claim 8, wherein the computer control system comprises at least one laser scanner.

11. The apparatus of claim 1, further comprising a computer control system, wherein the memory further contains instructions, that when executed by the processor, further performs the step of monitoring a peening impact depth of the dispensed second ply of thermoplastic composite tape.

12. The apparatus of claim 1, further comprising a computer control system, wherein the memory further contains instructions, that when executed by the processor, further performs the step of monitoring a peening impact density of the dispensed second ply of thermoplastic composite tape.

13. The apparatus of claim 1, further comprising a compaction roller.

14. The apparatus of claim 13, wherein the compaction roller is disposed downstream of the peening system.

15. The apparatus of claim 13, wherein the compaction roller is disposed upstream of the peening system.

16. The apparatus of claim 1, further comprising a polymer dispensing system, the polymer dispensing system being used to dispense additional polymer between the first ply and the second ply of the thermoplastic composite tape before the step of peening.

17. The apparatus of claim 1, wherein the peening is performed onto the second ply and the first ply of thermoplastic composite tape not comprising a metallic layer.

18. The apparatus of claim 1, wherein the first ply and second ply of thermoplastic composite tape are dispensed while being heated by the heating system.

19. The apparatus of claim 18, wherein the peening of the second ply onto the first ply using the peening system is performed when at least the second ply is heated.

20. The apparatus of claim 18, wherein the peening of the second ply onto the first ply using the peening system is performed when at least the second ply is at or above 143 degrees Celsius.

21. The apparatus of claim 18, wherein the peening of the second ply onto the first ply using the peening system is performed when at least the second ply ranges from 143 degrees Celsius to 500 degrees Celsius.

22. The apparatus of claim 1, wherein the peening system comprises pins of any size or shape consisting of blunt ends.

23. An apparatus comprising:
a tape dispensing system;
a heating system;
a peening system;
a processor;
a memory coupled to the processor, wherein the memory contains instructions that when executed by the processor perform the steps of:
dispensing from the tape dispensing system a first ply of thermoplastic composite tape over a mandrel;
dispensing from the tape dispensing system a second ply of thermoplastic composite tape on the first ply; and
peening the second ply onto the first ply using the peening system, such that the second ply is bonded to the first ply; and
a computer control system, wherein the memory further contains instructions, that when executed by the processor, further performs the step of monitoring a peening impact depth of the dispensed second ply of thermoplastic composite tape.

24. An apparatus comprising:
a tape dispensing system;
a heating system;
a peening system;
a processor;
a memory coupled to the processor, wherein the memory contains instructions that when executed by the processor perform the steps of:
dispensing from the tape dispensing system a first ply of thermoplastic composite tape over a mandrel;
dispensing from the tape dispensing system a second ply of thermoplastic composite tape on the first ply; and
peening the second ply onto the first ply using the peening system, such that the second ply is bonded to the first ply; and
a computer control system, wherein the memory further contains instructions, that when executed by the processor, further performs the step of monitoring a peening impact density of the dispensed second ply of thermoplastic composite tape.

* * * * *